June 21, 1955
B. S. MORRILL
2,711,310
BAKING AND DRYING OVEN
Filed July 21, 1954
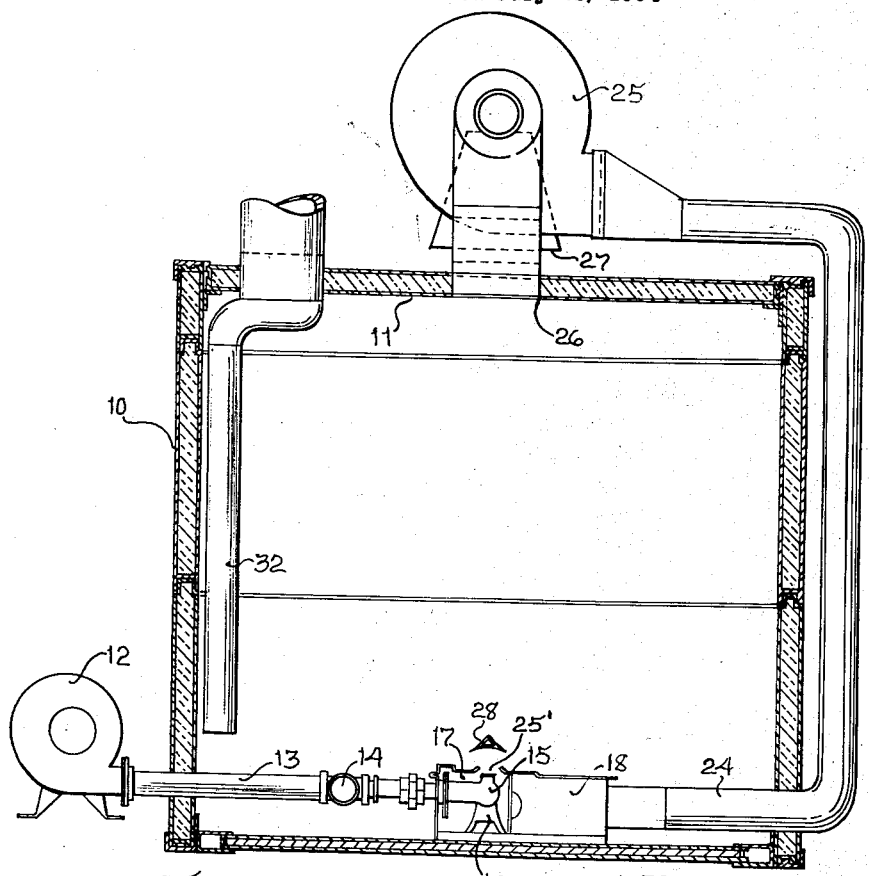
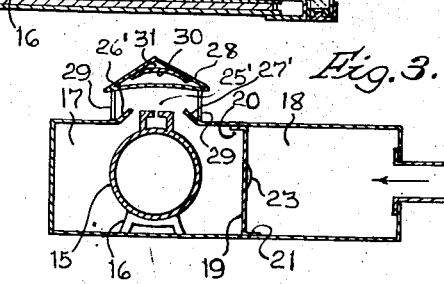
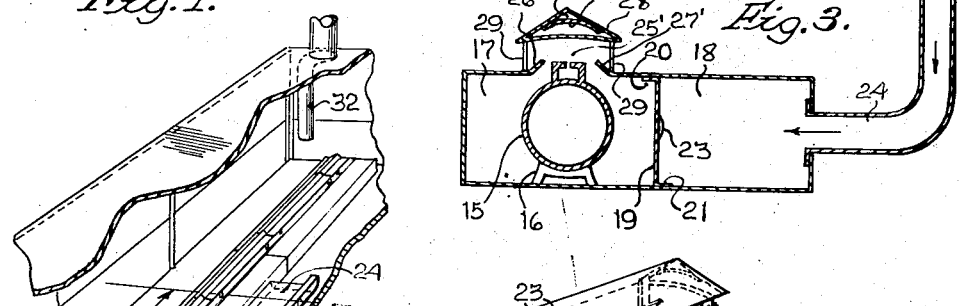
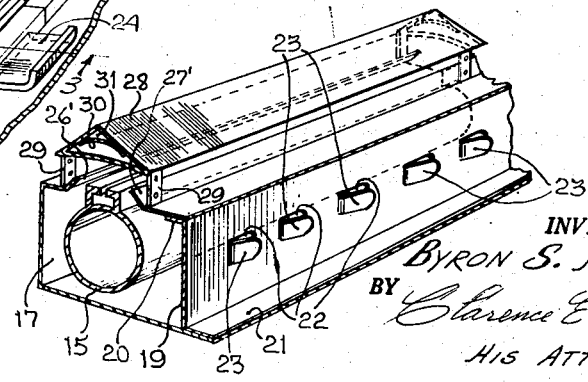
INVENTOR.
BYRON S. MORRILL
BY
HIS ATTORNEY.

United States Patent Office 2,711,310
Patented June 21, 1955

2,711,310

BAKING AND DRYING OVEN

Byron S. Morrill, Chicago, Ill.

Application July 21, 1954, Serial No. 444,757

12 Claims. (Cl. 263—19)

This invention relates to a new and useful improvement in a baking and drying oven and more specifically to an oven of the type wherein the temperature has a range of 150 degrees F. to 750 degrees F.

Another object of my invention is the provision of an oven of this character whereby convection heated air, radiant heat and infra-red ray heat are developed and used simultaneously.

Still another object of my invention is the provision in an oven of this character of a method of ventilation which affords the use of a maximum amount of recirculated air readily mixed with a predetermined amount of fresh air.

Another and equally important object of my invention is in the novel method of directing the recirculated heated air and the fresh air through a heat combustion area and then directing and reflecting the heated air throughout the oven area.

Another object of my invention is the provision in an oven of this character of locating the burner unit in a forced draft recirculating air duct whereby the burner is kept at a minimum temperature while giving off maximum heat.

Still another object of my invention is the provision of means in an oven of this character whereby fresh and heated recirculated air may be evenly directed from a single source throughout the combustion area of the oven's heating unit.

Yet another object of my invention is the provision of an oven of this character which results in ease of assembly and which is economical in manufacture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a vertical cross sectional view of my improved oven;

Fig. 2 is a fragmentary perspective view of the interior of my improved oven without showing the fuel supply system;

Fig. 3 is a detailed sectional view taken on line 3—3 of Fig. 2; and

Fig. 4 is a fragmentary perspective view of the regulated air entrance duct and heat deflector unit.

A baking and drying oven is indicated as at 10. This oven is made up of wall sections joined together in any suitable manner, such as by tongue and groove arrangement, as shown. The roof 11, as well as the walls and floor of the oven, on their inner sides are equipped with a heat reflective silicon surface and are insulated throughout the area by the use of a common rock wool insulation. All of these features are well known in the art and make up no part of my present invention.

A pre-mixing gas and air blower 12 is positioned externally of the oven at the forward end thereof. This blower supplies the combustible mixture through a pipe 13 and a control valve 14 into a line type burner unit 15, all positioned within the oven on the floor thereof and extending throughout the length of the oven.

The burner 15 is supported by suitable stands 16 strategically placed throughout its length. The burner 15 is positioned within a combustion chamber 17. This combustion chamber 17 is divided from an air distributing chamber 18 by a wall 19.

This wall 19 at its upper and lower portions is provided with oppositely extending flanges 20 and 21, which flanges are fastened in any suitable manner, such as by spot welding in any desired position whereby the wall will divide the two chambers. This wall 19 is provided with air passages 22. These passages are preferably arranged as a row of horizontal U-shaped slots, with the material that is displaced in forming the slots being bent inwardly of the chambers 18 so as to provide adjustable baffles 23. These adjustable baffles 23 will permit regulation of the amount of air passing from the distributing chamber 18 through the air passages 22 and into the combustion chamber 17 in a manner hereinafter described.

An air supply duct 24 has a central connection to the air chamber 18, as shown in Fig. 2. This duct passes out the side wall of the oven and extends in a vertical direction to the top thereof and to a point immediately over the center of the roof 11 where it connects to a fan 25. This fan 25 has open connection with the interior of the oven through a ceiling opening 26. The fan also is provided with a fresh air duct 27, such fresh air duct being positioned exteriorly of the oven as shown in Fig. 1.

Under such a construction, the air that is admitted into the chamber 18 is a combination of fresh air taken in through the duct 27 and heated air exhausted from the oven through the opening 26. However, by reason of the travel of the air through the duct 24, the fresh air and the heated air are thoroughly mixed upon their arrival in the chamber 18.

In constructing the oven 10 and particularly the air passages 22 of the wall 19, it should be noted that the open face of these passages should always face the point of entrance of the air coming into the chamber 18 from the duct 24. As I have shown, the duct 24 is positioned at the center of the oven and therefore it may be assumed that the passages 22, together with their baffles 23, which are formed in the wall 19 at the rear of the oven would face in a direction opposite to those shown in Fig. 4. With such an arrangement and by having the passages closest to the duct 24 closed tighter by means of the adjustable baffles 23 and with the passages at the extremities of the wall 19 open as wide as possible, the amount of air admitted into the combustion chamber 17 can be regulated and be made uniform throughout the length thereof.

The combustion chamber 17 has provided in the top wall thereof an elongated opening 25'. The sides 26' and 27' along this opening 25' are bent obliquely upward and outward with respect to the chamber 17 as viewed in Figs. 1, 3 and 4. Positioned within the chamber 17 and between and in spaced relation with respect to these sides is the slot burner of the burner unit 15.

Carried by this top wall of the chamber 17 and positioned directly over the elongated opening 25' is a deflector hood 28. This hood 28 is supported in spaced relation to the top wall of the combustion chamber 17 by legs 29 which are connected in any suitable manner to the sides 26' and 27', as shown in Figs. 3 and 4. This hood 28 is triangular in cross section with the base of the triangle arced to form a flame deflector 30. The hood deflector 28 as well as the flame deflector 30 is made of a cheap metal and is coated with a metallic pigment heat-resisting paint which enables the hood and the frame deflector to withstand a great degree of heat. In the drawings, the hood deflector 28 is shown as being constructed in a plurality of sections but it may be required that this hood be formed of a one-piece construction and such construction would not depart from the spirit of the invention. The deflector hood 28 is open at both ends and is hollow throughout its length and therefore is provided with an air passage 31 formed by the triangular sides of the hood and the arcuated flame deflector 30. Through this passage 31 the circulating air of the oven is adapted to pass and as it does, it will perform two important functions. The first function is that it will absorb some of the immediate heat of the burner and transpose that heat to the hood 28 from whence a conductive heat is transferred into the oven. The second function is that by such air passing through the passage 31 and accomplishing such heat transfer, the air will thereby prevent the overheating of the flame deflector plate 30.

To the rear of the oven 10 and extending downwardly from the top 11 thereof, I have provided an exhaust pipe 32 that has an exit exterior of the oven.

The operation is as follows: As the blower 12 is operated, a mixture of gas and air will pass into the burner unit 15. At the same time the fan 25 will commence to force air through the duct 24 into the air chamber 18. The air will then pass through the air passages 22 under uniform pressure into the combustion chamber 17. As the air and gas mixture is ignited and the recirculated fresh air is forced into the chamber 17, the burner 15 will be placed in a forced draft. The flames of the burners will extend up to the flame deflector 30 and be deflected in a downwardly and sidewardly direction. The forced air being admitted into the combustion chamber 17 will pass out the opening 25' under pressure. This by reason of the fact that the sides 26' and 27' are constructed to form a restricted passage. The air is heated as it passes over the burner 15 and the flames thereof. This heated air passes throughout the area of the oven and is reflected off the reflective coating of the interior thereof. A portion of the heated air in the oven is permitted to pass out of the exhaust 32. The remaining portion of the heated air will pass through the opening 26 into the fan 25 at which point it will be mixed with fresh air and again sent through the circulating cycle as described. As the relatively cool air again enters the combustion chamber, it will first engage and cool the burner 15. It will then be forced through the flames and be reheated. This reheated air will continue through the above cycle and will be evenly circulated throughout the area of the oven. Such a construction permits the use of cheaper materials such as cast iron in the construction of burner and hood and flame deflector.

My oven may be provided with a suitable conveyor system (not shown) of the overhead type. With such a conveyor system the products to be baked or dried may be suspended therefrom so as to hang freely within the oven. By reason of my forced draft burning system and the novel system of recirculating the air of the oven, I have accomplished a process for more evenly baking and drying the product within the oven.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having a flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, means for continuously circulating a portion of the heated air of said oven through said air distributing chamber and into said combustion chamber and out through said flame, and an air exhaust for said oven.

2. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having a flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, means for continously circulating a portion of the heated air of said oven through said air distributing chamber and into said combustion chamber and out through said flame, an air exhaust for said oven, and means for mixing a supply of fresh air with the heated air of said oven before said air circulates through said chambers and said flame.

3. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having an arcuated flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, means for continuously circulating a portion of the heated air of said oven through said air distributing chamber and into said combustion chamber and out through said flame, and an air exhaust for said oven.

4. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having an arcuated flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, means for continuously circulating a portion of the heated air of said oven through said air distributing chamber and into said combustion chamber and out through said flame, an air exhaust for said oven, and means for mixing a supply of fresh air with the heated air of said oven before said air circulates through said chambers and said flame.

5. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having a flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, means for uniformly regulating the amount of air passing through said air passages, means for continuously circulating a portion of the heated air of said oven through said air distributing chamber and into said combustion chamber and out through said flame, and an air exhaust for said oven.

6. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having an arcuated flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, means for uniformly regulating the amount of air passing through said air passages, means for continuously circulating a portion of the heated air of said oven through said air distributing chamber and into said combustion chamber and out through said flame, an air exhaust for said oven, and means for mixing a supply of fresh air with the heated air of said oven before said air circulates through said chambers and said flame.

7. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having a flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, fan means for continuously circulating a portion of the heated air of said oven through said air distributing chamber and into said combustion chamber and out through said flame, and an air exhaust for said oven.

8. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having a flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, said last named means including baffles cut out of said separating wall and bent to extend inwardly of said air distributing chamber, means for continuously circulating a portion of the heated air of said oven through said air distributing chamber and into said combustion chamber and out through said flame, and an air exhaust for said oven.

9. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having a flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, said last named means including baffles cut out of said separating wall and bent to extend inwardly of said air distributing chamber, said baffles formed in said separating wall so as to face said air supply duct, said baffles being adjustable so as to permit a uniform amount of air to pass therethrough and into said combustion chamber, means for continuously circulating a portion of the heated air of said oven through said air distributing chamber and into said combustion chamber and out through said flame, and an air exhaust for said oven.

10. An oven for baking and drying, a burner housed in a combustion chamber of said oven and adapted for heating the air of said oven, said combustion chamber provided with a top wall having formed therein an elongated slot out of which the flame of said burner extends, a substantially triangular shaped deflector hood carried by said top wall above and in spaced relation to said slot, said hood having a flame deflecting base for directing said flame of said burner in a downward and sideward direction with respect to said hood, an air distributing chamber integrally connected to said combustion chamber, an air supply duct having communication with said air distributing chamber, a separating wall between said chambers, means on said separating wall providing air passages between said chambers, said last named means including baffles cut out of said separating wall and bent to extend inwardly of said air distributing chamber, said baffles formed in said separating wall so as to face said air supply duct, said baffles being adjustable so as to permit a uniform amount of air to pass therethrough and into said combustion chamber, fan means for continuously circulating a portion of the heated air of said oven through said air distributing chamber and into said combustion chamber and out through said flame, and an air exhaust for said oven.

11. An oven for baking and drying, a combustion chamber extending throughout the length of said oven, a burner in said combustion chamber, a fuel supply for said burner, said combustion chamber having formed in the top wall thereof an elongated slot through which the flame from said burner projects, a flame deflector carried by said top wall above and in spaced relation to said slot, an air distributing chamber integral with said combustion chamber, an air supply duct for said air chamber, means for permitting air to pass under uniform pressure from said air distributing chamber to said combustion chamber, means for directing said forced air through said flame for heating the air, and means for mixing said heated air with fresh air and recirculating said mixture throughout said chambers and into said oven.

12. An oven for baking and drying, a combustion chamber extending throughout the length of said oven, a burner in said combustion chamber, a fuel supply for said burner, said combustion chamber having formed in the top wall thereof an elongated slot through which the flame from said burner projects, a flame deflector carried by said top wall above and in spaced relation to said slot, an air distributing chamber integral with said combustion chamber, an air supply duct for said air chamber, adjustable means for permitting air to pass under uniform pressure from said air distributing chamber to said combustion chamber, means for directing said forced air through said flame for heating the air, and fan means for mixing said heated air with fresh air and recirculating said mixture throughout said chambers and into said oven.

References Cited in the file of this patent

UNITED STATES PATENTS

| | | |
|---|---|---|
| 1,277,619 | McMullen | Sept. 3, 1918 |
| 1,950,212 | Barnett et al. | Mar. 6, 1934 |
| 2,512,326 | Harrison | June 20, 1950 |